United States Patent
Okerman

(10) Patent No.: US 10,312,679 B2
(45) Date of Patent: Jun. 4, 2019

(54) CIRCUIT INTERRUPTER WITH RESET MECHANISM

(71) Applicant: EATON CORPORATION, Cleveland, OH (US)

(72) Inventor: Jason Okerman, Pittsburgh, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 296 days.

(21) Appl. No.: 15/236,846

(22) Filed: Aug. 15, 2016

(65) Prior Publication Data

US 2018/0048143 A1    Feb. 15, 2018

Related U.S. Application Data

(60) Provisional application No. 62/375,036, filed on Aug. 15, 2016.

(51) Int. Cl.
| | |
|---|---|
| *H02H 3/10* | (2006.01) |
| *H02H 1/00* | (2006.01) |
| *H02H 3/093* | (2006.01) |
| *H02H 3/08* | (2006.01) |
| *H02H 3/16* | (2006.01) |
| *H01H 83/20* | (2006.01) |
| *B60L 3/04* | (2006.01) |

(52) U.S. Cl.
CPC ............ *H02H 3/10* (2013.01); *H02H 1/0015* (2013.01); *H02H 3/093* (2013.01); *B60L 3/04* (2013.01); *H01H 2083/201* (2013.01); *H02H 3/08* (2013.01); *H02H 3/16* (2013.01)

(58) Field of Classification Search
USPC ...................................... 361/42–50
See application file for complete search history.

(56) References Cited

U.S. PATENT DOCUMENTS

| | | | |
|---|---|---|---|
| 6,477,022 B1 * | 11/2002 | Ennis ..................... | H01H 89/06 335/18 |
| 8,508,896 B2 * | 8/2013 | Paoletti ................... | H02H 3/28 361/42 |
| 2014/0211345 A1 * | 7/2014 | Thompson .......... | B60L 11/1816 361/42 |

* cited by examiner

*Primary Examiner* — Danny Nguyen
(74) *Attorney, Agent, or Firm* — Eckert Seamans

(57) ABSTRACT

A circuit interrupter including a first set of separable contacts, a second set of separable contacts, a first operating mechanism structured to open the first set of separable contacts, a second operating mechanism structured to open and close the second set of separable contacts, and an electronic trip unit including a routine structured to detect a fault condition and a type of the fault condition, to control the second operating mechanism to open the second set of separable contacts in response to detecting a first type of fault condition, and to control the second operating mechanism to close the second set of separable contacts a predetermined amount of time after controlling the second operating mechanism to open the second set of separable contacts.

18 Claims, 3 Drawing Sheets

CIRCUIT INTERRUPTER WITH RESET MECHANISM

BACKGROUND

Field

The disclosed concept relates generally to circuit interrupters, and in particular, to arc fault circuit interrupters.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

When a circuit breaker trips, it must be manually reset to restore power to the load it is protecting. For some types of loads, such as a refrigerator or freezer, leaving the load without power for an extended period of time can be costly. For example, if a circuit breaker protecting a refrigerator trips while a homeowner is on vacation, the refrigerator could go without power for an extended period of time.

In many cases, a circuit breaker tripping is not due to a persistent fault in the circuit it protects. For example, in the case of nuisance trips or transient fault issues such as, without limitation, a power surge, the circuit breaker may be safely reset and power may be restored to the protected load. However, someone must manually reset the circuit breaker to restore power to the load. In the case of a persistent fault, the fault in the circuit should be addressed before the circuit breaker is reset. Otherwise, the circuit breaker will usually trip immediately after it is reset. It would be useful to remove the need to manually reset a circuit breaker when a trip is not due to a persistent fault.

There is thus room for improvement in circuit interrupters.

SUMMARY

These needs and others are met by embodiments of the disclosed concept in which a circuit interrupter is capable of automatically closing separable contacts a predetermined time after detecting certain types of faults.

In accordance with one aspect of the disclosed concept, a circuit interrupter comprises: a first set of separable contacts; a second set of separable contacts; a first operating mechanism structured to open the first set of separable contacts; a second operating mechanism structured to open and close the second set of separable contacts; and an electronic trip unit including a routine structured to detect a fault condition and a type of the fault condition, to control the second operating mechanism to open the second set of separable contacts in response to detecting a first type of fault condition, and to control the second operating mechanism to close the second set of separable contacts a predetermined time after controlling the second operating mechanism to open the second set of separable contacts.

In accordance with another aspect of the disclosed concept, a method for controlling a circuit interrupter including a first operating mechanism structured to open a first set of separable contacts and a second operating mechanism structured to open and close a second set of separable contacts comprises: detecting a fault condition; determining a type of the fault condition; controlling the second operating mechanism to open the second set of separable contacts in response to detecting a first type of fault condition; and controlling the second operating mechanism to close the second set of separable contacts a predetermined amount of time after controlling the second operating mechanism to open the second set of separable contacts.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
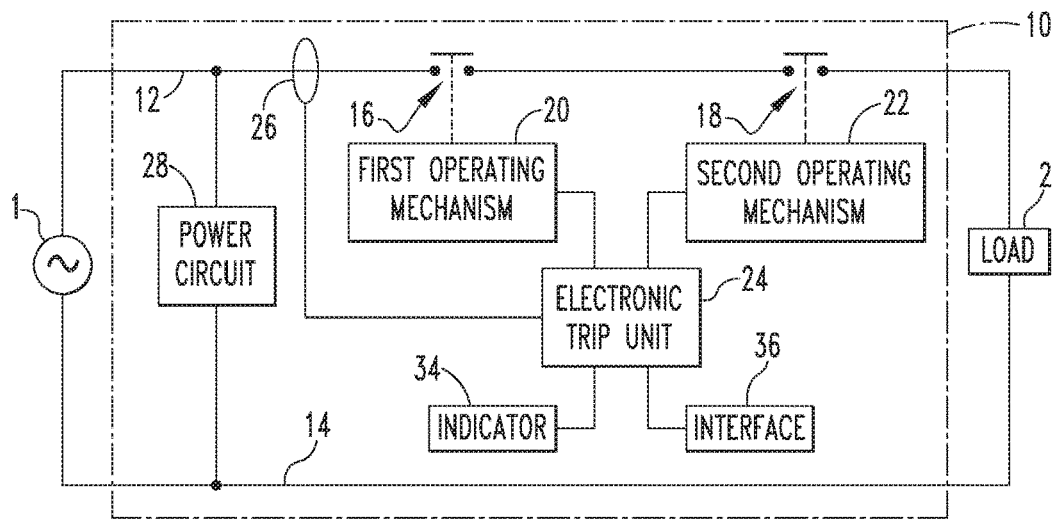
FIG. 1 is a schematic diagram of a circuit interrupter including two sets of separable contacts in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

FIG. 1 is a schematic diagram of a circuit interrupter 10 in accordance with an example embodiment of the disclosed concept. The circuit interrupter 10 is electrically connected between a power source 1 and a load 2 and includes a line conductor 12 and a neutral conductor 14. The circuit interrupter 10 further includes a first set of separable contacts 16 and a second set of separable contacts 18 as well as a corresponding first operating mechanism 20 and a second operating mechanism 22. The first and second sets of separable contact 16,18 are electrically connected along the line conductor 12, and opening the first or second set of separable contacts 16,18 opens the electrical circuit between the power source 1 and the load 2 and stops current from flowing from the power source 1 to the load 2. The first operating mechanism 20 is structured to open the first set of separable contacts 16 and the second operating mechanism 22 is structured to open the second set of separable contacts 18.

The circuit interrupter 10 further includes an electronic trip unit 24 and one or more sensors that sense characteristics of power flowing between the power source 1 and the load 2, such as the example current sensor 26. Although only the current sensor 26 is shown in FIG. 1, it will be appreciated by those having ordinary skill in the art that other sensors such as, for example and without limitation, voltage sensors, temperature sensors, or any other suitable sensors to monitor characteristics of power flowing between the power source 1 and the load 2 may be employed in the circuit interrupter 10 without departing from the scope of the disclosed concept. The electronic trip unit 24 is structured to determine whether a fault condition exists (e.g., without limitation, an arc fault) based on the outputs of the one or more sensors. In response to determining that a fault condition exists, the electronic trip unit 24 controls the first operating mechanism 20 or the second operating mechanism 22 to open the corresponding first or second set of separable contacts 16,18.

Figure 2:
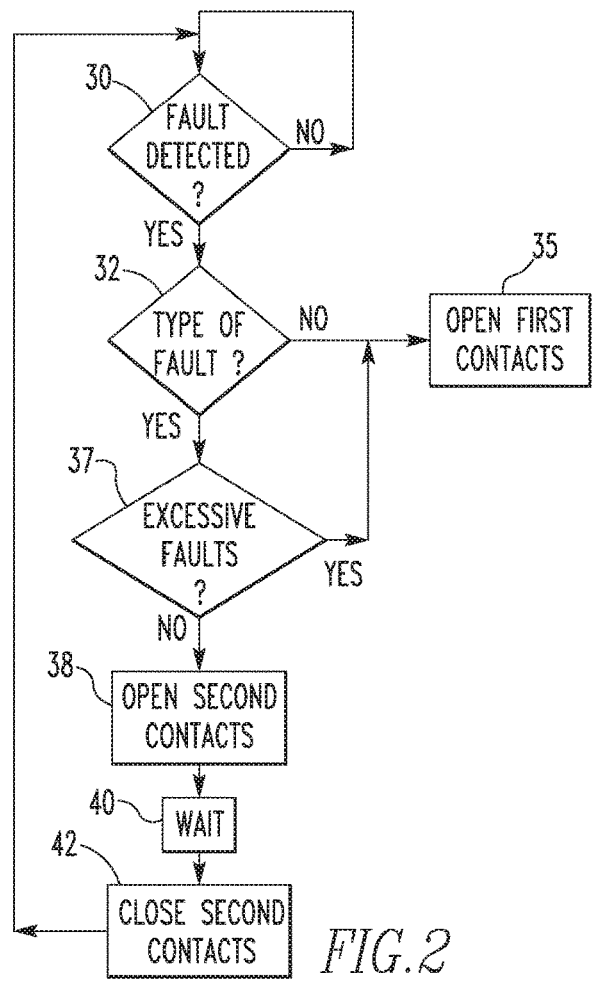
FIG. 2 is a flowchart of a routine of an electronic trip unit of the circuit interrupter of FIG. 1.

In some example embodiments of the disclosed concept, the electronic trip unit 24 is structured to execute the routine illustrated in FIG. 2. Referring to FIG. 2, the electronic trip unit 24 determines whether a fault has been detected at 30. Upon detection of a fault, the routine proceeds to 32. The electronic trip unit 24 is structured to selectively control one of the first and second operating mechanisms 20,22 to open one of the first and second sets of separable contacts 16,18 based on the type of fault that is detected and, at 32, the electronic trip unit 24 determines which of the first and second sets of separable contacts 16,18 to open based on the type of fault that is detected. For example and without limitation, when the electronic trip unit 24 detects a certain type of fault (e.g., without limitation, an overcurrent fault), the routine proceeds to 35 and the electronic trip unit 24 selectively controls the first operating mechanism 20 to open the first set of separable contacts 16. However, for other types of faults (e.g. without limitation, an arc fault) the routine proceeds to 37.

At 37, the electronic trip unit 24 determines whether an excessive number of faults have occurred within a predetermined amount of time. The excessive number may be any predetermined number and the predetermined amount of time may be any amount of time. The excessive number and the predetermined amount of time may be set and stored within the electronic trip unit 24. If an excessive number of faults have occurred within a predetermined time, the routine proceeds to 34 and the electronic trip unit 24 selectively controls the first operating mechanism 20 to open the first set of separable contacts 16. The occurrence of an excessive number of faults within a predetermined amount of time indicates that a persistent fault is present and should be addressed before reclosing the second set of separable contacts 18. If the electronic trip unit 24 determines that an excessive number of faults have not occurred within a predetermined amount of time, the routine proceeds to 38 and the electronic trip unit 24 selectively controls the second operating mechanism 22 to open the second set of separable contacts 18.

After the second set of separable contacts 18 have been opened, the routine proceeds to 40 and the electronic trip unit 24 waits a predetermined period of time. The predetermined period of time may be a fixed time or a time determined based on characteristics of the power flowing between the power source 1 and the load 2. In some example embodiments of the disclosed concept, the predetermined time is based on a reasonable time needed for a conductor to cool down after an arc fault. The predetermined time may be experimentally determined and hard-coded in the electronic trip unit 24. It is also contemplated that the predetermined time may be derived from a lookup table stored in the electronic trip unit 24 based on one or more characteristics (e.g., without limitation, current) of the power flowing between the power source 1 and the load 2. For example and without limitation, the lookup table may associate shorter times with lower currents and longer times with higher currents. As such, when a higher current is present at the time the fault is detected by the electronic trip unit 24, the electronic trip unit 24 may derive a longer predetermined time from the lookup table. Although deriving the predetermined time based on current flowing between the power source 1 and the load 2 has been described, it will be appreciated that the predetermined time may also be derived from any characteristic of the power flowing between the power source 1 and the load 2 without departing from the scope of the disclosed concept.

After waiting the predetermined time, the routine proceeds to 42 where the electronic trip unit 24 controls the second operating mechanism 22 to close the second set of separable contacts 18. Once the second set of separable contacts 18 are closed, power can again flow between the power source 1 and the load 2. The routine then proceeds back to 30 where the electronic trip unit 24 again determines whether a fault has been detected. If the fault that had been previously detected is a persistent fault, rather than a transient fault that has resolved itself during the predetermined time the second set of separable contacts 18 were open, the electronic trip unit 24 will proceed to control the first or second operating mechanisms 20,22 to open the first or second set of separable contacts 16,18 to open, depending on how many times the fault has recently been detected.

Referring back to FIG. 1, the circuit interrupter 10 further includes a power circuit 28. Power is useful to control the second operating mechanism 22 to close the second set of separable contacts 18 even when power is not flowing between the power source 1 and the load 2. The power circuit 28 is structured to provide the power to control the second operating mechanism 22 to close the second set of separable contacts 18 even when power is not flowing between the power source 1 and the load 2. To this end, in some example embodiments of the disclosed concept, the power circuit 28 is electrically connected to the line and neutral conductors 12,14 and electrically connected to the line conductor 12 at a point between the second set of separable contacts 18 and the power source 1. By connecting the power circuit 28 to the line conductor 12 in this manner, the power circuit 28 is still able to leech power from the power source 1 even when the second set of separable contacts 18 is open. Thus, the power circuit 28 is able to provide power to for the second operating mechanism 22 to close the second set of separable contacts 22. In some example embodiments of the disclosed concept, the power circuit 28 provides power to the electronic trip unit 24 so that it can continue operating when the second set of separable contacts 18 are open.

In some example embodiments of the disclosed concept, the first set of separable contacts 16 are primary contacts of the circuit interrupter 10 and the second set of separable contacts 18 are secondary contacts of the circuit interrupter 10. The first operating mechanism 20 may be structured to open the first set of separable contacts 16, but then must be manually reset by operating a handle of the circuit interrupter 10. The second operating mechanism 22 may be a solenoid that can be electronically controlled to open or close the second set of separable contacts 18. The electronic trip unit 24 can thus control the second operating mechanism 22 to both open and close the second set of separable contacts 18 without manual intervention by a user.

Moreover, in some example embodiments of the disclosed concept, the second set of separable contacts 18 and second operating mechanism 22 have a lower interruption rating than the first set of separable contacts 16 and first operating mechanism 20. As used herein, the interruption rating is the maximum current that an interruption mechanism has been determined to be able to safely interrupt. Higher currents generally require more robust operating mechanisms and separable contacts to be able to safely interrupt the current. In some example embodiments of the disclosed concept, the first operating mechanism 20 and first set of separable contacts 16 have an interruption rating of about 10 kA, while the second operating mechanism 22 and the second set of separable contacts 18 have an interruption rating lower than 10 kA. In some other example embodiments of the disclosed concept, the first operating mechanism 20 and first set of separable contacts 16 have an interruption rating of about 22 kA, while the second operating mechanism 22 and the second set of separable contacts 18 have an interruption rating lower than 22 kA. When the second operating mechanism 22 and second set of separable contacts 18 are only used to interrupt current due to types of faults not generally associated with high currents such as, without limitation, arc faults, the second operating mechanism 22 and second set of separable contacts 18 do not need to have an interruption rating as high as the rating of the circuit interrupter 10 and, as such, less robust and generally less expensive components may be used in the second operating mechanism 22 and second set of separable contacts 18.

In some example embodiments of the disclosed concept, the circuit interrupter 10 includes an indicator 34. The indicator 34 may be any type of indicator (e.g., without limitation, a light, a speaker, etc.) suitable to provide indication to a person in the vicinity of the circuit interrupter 10. The indicator 34 is electrically connected to the electronic trip unit 24 and the electronic trip unit 23 is structured to activate the indicator in response to opening the first set of contacts 34 due to an excessive number of detected faults (e.g., without limitation, arc faults).

Additionally, in some example embodiments of the disclosed concept, the circuit interrupter 10 includes an interface 36. The interface 36 is electrically connected to the electronic trip unit 24 and provides an interface for adjusting the predetermined time the electronic trip unit 24 waits before closing the second set of separable contacts 18. The interface 36 may be an interface that a person can interact such as, without limitation, a dial or multi-position switch, to manually adjust the predetermined time. The interface 36 may also be an input such as, without limitation, an electrical interface that a person may electrically connect an external electrical device to in order to programmatically adjust the predetermined time.

Figure 3A:
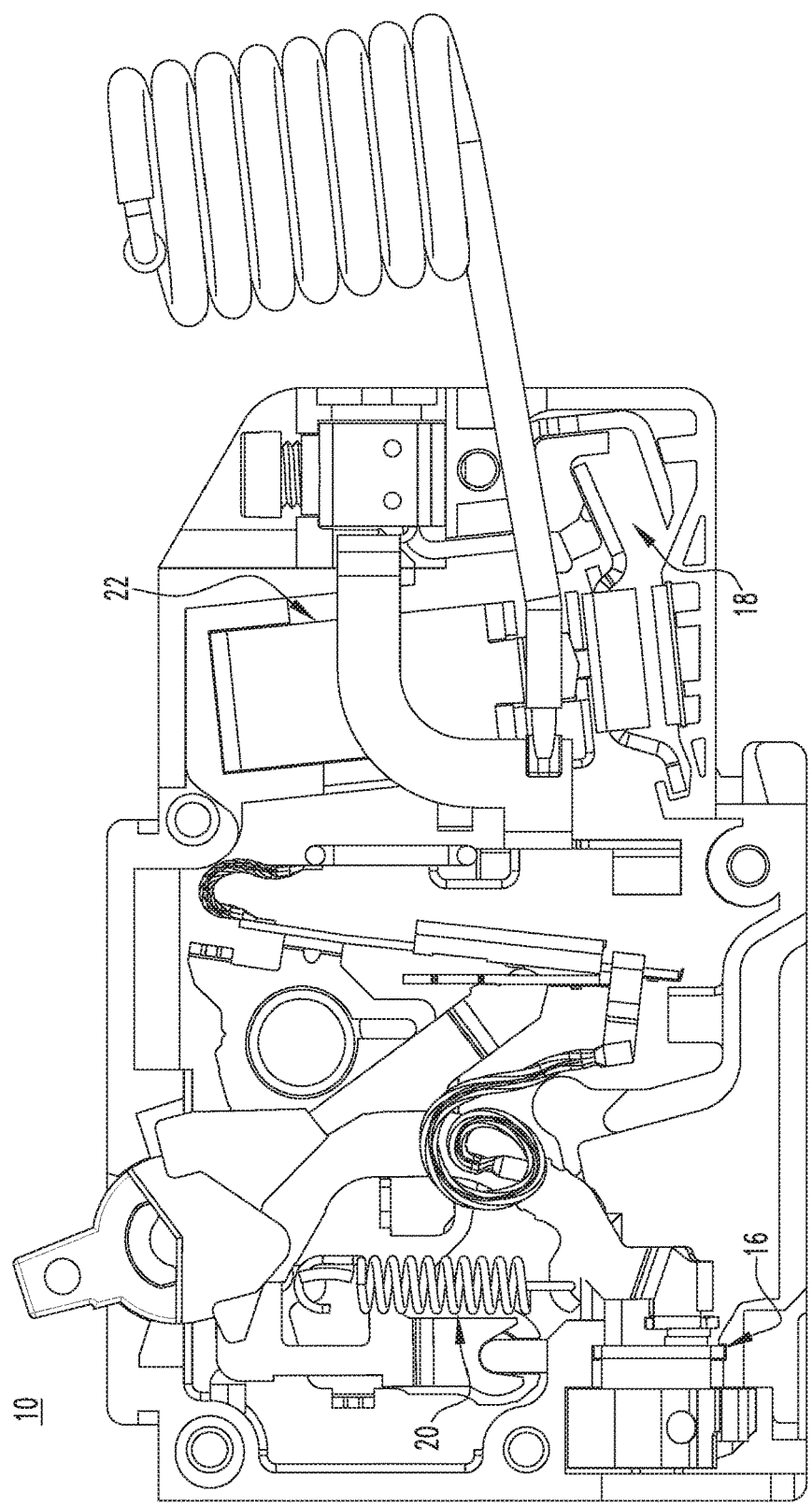
FIG. 3A is a cross-sectional view of an example architecture of the circuit interrupter of FIG. 1.
Figure 3B:
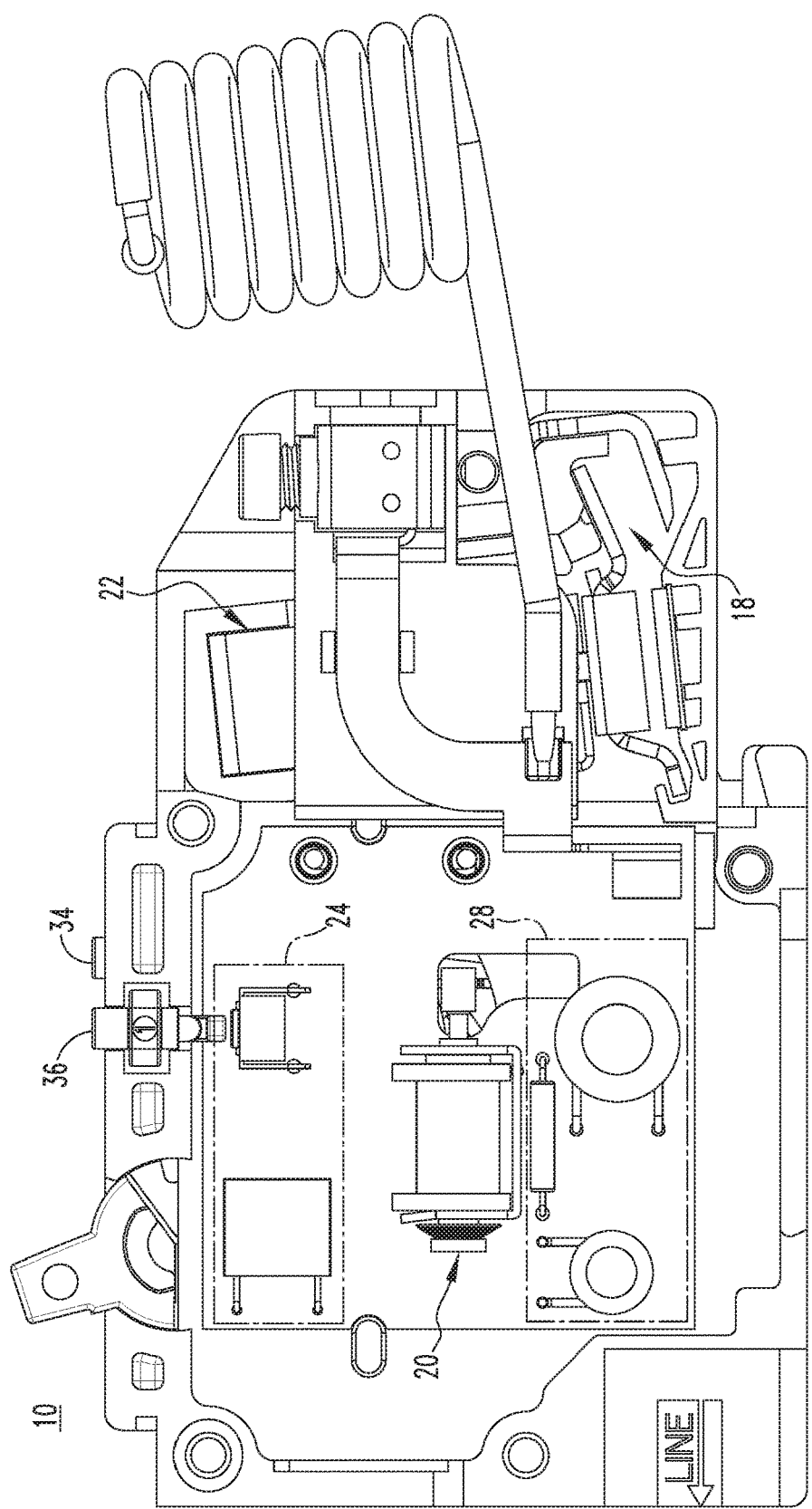
FIG. 3B is another cross-sectional view of an example architecture of the circuit interrupter of FIG. 1.

Referring to FIGS. 3A and 3B, cross-sectional views of an example mechanical architecture of the circuit interrupter 10 are shown. The cross-sectional view shown in FIG. 3A is cut deeper from a front surface of the circuit interrupter 10 than the cross-sectional view shown in FIG. 3B. Thus, FIG. 3B shows a printed circuit board and other electrical components that are disposed closer to the front surface of the circuit interrupter than the components shown in FIG. 3A.

As shown in FIGS. 3A and 3B, in some example embodiments, some electrical components of the circuit interrupter 10, such as components of the electronic trip unit 24, the power circuit 28, and some electrical components of the first operating mechanism 20 may be disposed on a substrate such as a printed circuit board. Additionally, in some example embodiments, the indicator 34 and interface 36 may be located at a top surface of the circuit interrupter 10 along with a handle to manually reset the first operating mechanism 20. The top surface of the circuit interrupter 10 is typically easily visible and accessible when the circuit interrupter is installed in a panel board.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:
    a first set of separable contacts;
    a second set of separable contacts;
    a first operating mechanism structured to open the first set of separable contacts;
    a second operating mechanism structured to open and close the second set of separable contacts; and
    an electronic trip unit including a routine structured to detect a fault condition and a type of the fault condition, to control the second operating mechanism to open the second set of separable contacts in response to detecting a first type of fault condition, and to control the second operating mechanism to close the second set of separable contacts a predetermined amount of time after controlling the second operating mechanism to open the second set of separable contacts,
    wherein the routine is structured to determine whether a predetermined number of faults have occurred within a second predetermined amount of time and to control the first operating mechanism to open the first set of separable contacts in response to determining that the predetermined number of faults have occurred within the second predetermined amount of time.

2. The circuit interrupter of claim 1, wherein the first type of fault condition is an arc fault.

3. A circuit interrupter comprising:
    a first set of separable contacts;
    a second set of separable contacts;
    a first operating mechanism structured to open the first set of separable contacts;
    a second operating mechanism structured to open and close the second set of separable contacts; and
    an electronic trip unit including a routine structured to detect a fault condition and a type of the fault condition, to control the second operating mechanism to open the second set of separable contacts in response to detecting a first type of fault condition, and to control the second operating mechanism to close the second set of separable contacts a predetermined amount of time after controlling the second operating mechanism to open the second set of separable contacts, wherein the routine is further structured to control the first operating mechanism to open the first set of separable contacts in response to detecting a second type of fault condition.

4. The circuit interrupter of claim 3, wherein the second type of fault condition is an overcurrent fault.

5. The circuit interrupter of claim 1, further comprising:
    an indicator structured to provide an indication when activated, wherein the electronic trip unit is structured to activate the indicator in response to determining that the a predetermined number of fault conditions have occurred within the second predetermined amount of time.

6. A circuit interrupter comprising:
a first set of separable contacts;
a second set of separable contacts;
a first operating mechanism structured to open the first set of separable contacts;
a second operating mechanism structured to open and close the second set of separable contacts;
an electronic trip unit including a routine structured to detect a fault condition and a type of the fault condition, to control the second operating mechanism to open the second set of separable contacts in response to detecting a first type of fault condition, and to control the second operating mechanism to close the second set of separable contacts a predetermined amount of time after controlling the second operating mechanism to open the second set of separable contacts;
a line conductor electrically connected to a power source, wherein the first and second sets of separable contacts are disposed along the line conductor; and
a power circuit electrically connected to the line conductor between the second set of separable contacts and the power source,
wherein the power circuit is structured to leech power from the power source and to provide said power for the second operating mechanism to close the second set of separable contacts.

7. The circuit interrupter of claim 1, wherein the predetermined time is stored in the electronic trip unit.

8. The circuit interrupter of claim 1, wherein the electronic trip unit is structured to derive the predetermined amount of time from a lookup table based on one or more characteristics of power flowing through the circuit interrupter when the fault condition was detected.

9. The circuit interrupter of claim 1, wherein the second operating mechanism includes a solenoid.

10. A circuit interrupter comprising:
a first set of separable contacts;
a second set of separable contacts;
a first operating mechanism structured to open the first set of separable contacts;
a second operating mechanism structured to open and close the second set of separable contacts; and
an electronic trip unit including a routine structured to detect a fault condition and a type of the fault condition, to control the second operating mechanism to open the second set of separable contacts in response to detecting a first type of fault condition, and to control the second operating mechanism to close the second set of separable contacts a predetermined amount of time after controlling the second operating mechanism to open the second set of separable contacts, wherein the second set of separable contacts have a lower interruption rating than the first set of separable contacts.

11. A method for controlling a circuit interrupter including a first operating mechanism structured to open a first set of separable contacts and a second operating mechanism structured to open and close a second set of separable contacts, the method comprising:
detecting a fault condition;
determining a type of the fault condition;
controlling the second operating mechanism to open the second set of separable contacts in response to detecting a first type of fault condition;
controlling the second operating mechanism to close the second set of separable contacts a predetermined amount of time after controlling the second operating mechanism to open the second set of separable contacts;
determining whether a predetermined number of faults have occurred within a second predetermined amount of time; and
controlling the first operating mechanism to open the first set of separable contacts in response to determining that the predetermined number of faults have occurred within the second predetermined amount of time.

12. The method of claim 11, wherein the first type of fault condition is an arc fault.

13. The method of claim 11, further comprising:
controlling the first operating mechanism to open the first set of separable contacts in response to detecting a second type of fault condition.

14. The method of claim 13, wherein the second type of fault condition is an overcurrent fault.

15. The method of claim 11, further comprising:
activating an indicator in response to determining that the predetermined number of faults have occurred within the second predetermined amount of time.

16. The method of claim 11, further comprising:
deriving the predetermined amount of time from a lookup table based on one or more characteristics of power flowing through the circuit interrupter when the fault condition was detected.

17. The method of claim 11, wherein the second operating mechanism includes a solenoid.

18. The method of claim 11, wherein the second set of separable contacts have a lower interruption rating than the first set of separable contacts.

* * * * *